No. 620,986.  
C. P. STEINMETZ.  
FREQUENCY CHANGER.  
(Application filed Jan. 31, 1895.)  
Patented Mar. 14, 1899.
(No Model.)
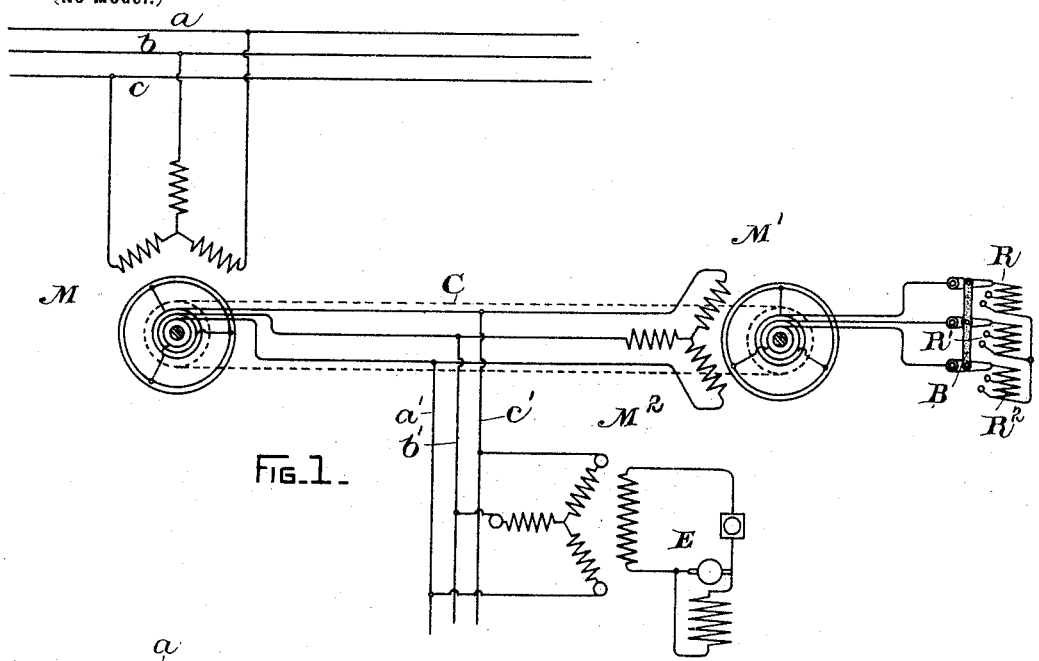
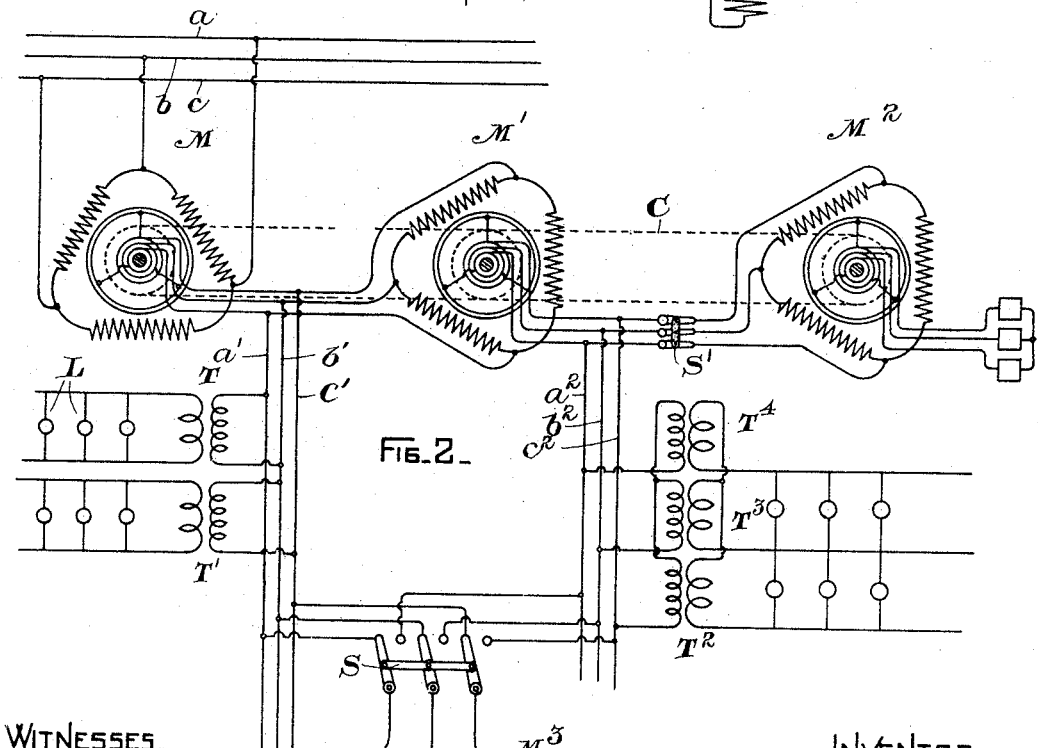
WITNESSES  
A. F. Macdonald.  
B. B. Hull.
INVENTOR  
Charles P. Steinmetz  
By Geo. R. Blodgett  
Atty.
THE NORRIS PETERS CO., PHOTO-LITHO., WASHINGTON, D. C.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

FREQUENCY-CHANGER.

SPECIFICATION forming part of Letters Patent No. 620,986, dated March 14, 1899.

Application filed January 31, 1895. Serial No. 536,872. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Frequency-Changers, of which the following is a specification.

The present invention relates to certain novel arrangements for changing the frequency of alternating currents, either of one or a plurality of phases, the object being to take currents from any distribution system or branch of a system in which the currents have a given frequency and to convert these currents into other currents having a frequency different from that of the currents supplied.

In the accompanying drawings, Figure 1 shows in diagram a system of distribution embodying a simple form of the invention, and Fig. 2 is a similar diagram showing the invention in a more extended form and comprising some improvements not present in Fig. 1.

In the drawings, $a\, b\, c$ represent the mains of a three-phase system, which is selected to illustrate the invention, though other polyphase systems or even single-phase systems may be treated in a similar manner. An induction-motor M has its primary coils connected to the respective mains, and its secondary member is coupled in circuit with the primary coils of a second similar motor M'. The secondary of motor M' is closed through variable resistances R R' R², more or less of which may be cut into or out of circuit by any suitable switching mechanism—as, for example, the three-arm switch B—which connects with contacts joined to various points in the resistances, as shown. To secure steadiness of action, the motors are geared mechanically, so as to run in unison. In practice this may be accomplished by mounting the rotating members on a common shaft or by any desired form of gearing. A belt C is shown for this purpose in the drawings, which is supposed to pass around pulleys of like diameter on the shafts of the rotating members of the motors. With such an arrangement the motors will be maintained in rotation at equal speeds, each running at substantially half the speed which either one alone would attain under similar conditions if connected to the circuit $a\, b\, c$. The frequency in the circuit connecting the secondary of motor M to the primary of motor M' is equal to the difference between the line frequency and the speed of the secondary member of motor M. From these connecting-leads I bring out a working circuit $a'\, b'\, c'$, in which the frequency will have a value different from that in the circuit $a\, b\, c$ by an amount depending upon the conditions under which the motors are operated. Translating devices of any desired character may be operated on this last circuit. There is shown a synchronous motor $M^2$, whose field-coils are excited in the ordinary manner by a direct-current generator E.

In the system shown in Fig. 2 there are three induction-motors M M' $M^2$, geared together by belts C or in any other manner and coupled in tandem, as already explained. The primary of motor M receives current from the mains $a\, b\, c$, and resistances are provided in the secondary circuit of the last motor $M^2$. Circuits $a'\, b'\, c'$ and $a^2\, b^2\, c^2$ are brought out from the leads connecting, respectively, the motors M M' and M' $M^2$. From these last circuits translating devices are operated as required. Lamps L are shown coupled with the circuit $a'\, b'\, c'$ through transformers T T', and in a similar manner lamps are operated from circuit $a^2\, b^2\, c^2$ by transformers $T^2\, T^3\, T^4$. With this arrangement the motors M M' $M^2$ will run at one-third the speed corresponding to the line frequency, which means that the frequency in circuit $a'\, b'\, c'$ will be substantially two-thirds of the line frequency, while the frequency in circuit $a^2\, b^2\, c^2$ will be one-third of the line frequency. In this manner the line frequency is divided up into two or more circuits having relatively different frequencies. By adding more motors the subdivision can be carried to any extent desired and a group of working circuits secured of graduated frequencies. An induction-motor $M^3$ is shown as having its primary connected to the circuit $a'\, b'\, c'$ by a three-arm switch S, while its secondary is closed through adjustable resistances R R' R², more or less of which may be brought into circuit by the switch B or any other preferred form of switching mechanism. Contacts are brought out from the circuit $a^2$ $b^2$ $c^2$, so that the motor may be thrown from one circuit to another by the switch S, as will be understood from the drawings. The speed of the motor may then be regulated partly by the resistances in the secondary circuit or by throwing the primary from one to another of the circuits $a'$ $b'$ $c'$ and $a^2$ $b^2$ $c^2$, which are maintained, as explained, at different frequencies, or without shifting the motor from the circuit $a'$ $b'$ $c'$ the running conditions of the induction-motors M M' M² may be regulated in a variety of ways, so as to change the frequency in the circuit $a'$ $b'$ $c'$. For example, if one of the motors M² be cut out of circuit by the switch and the secondary of motor M' be closed so as to leave only two motors in the tandem series the speed of the motors will rise to one-half of the line frequency, and the frequency in circuit $a'$ $b'$ $c'$ will fall from two-thirds to one-half the line frequency. Other methods of regulating the frequency in the secondary circuit of one or more of the motors by adjusting the running conditions will be understood by engineers.

Though the secondary machines of each series are constructed like ordinary induction-motors and though I have spoken of them as such, it is evident that in the actual operation of the machines they may act as generators driven mechanically by one or more of the other motors of the series and supplying currents to the secondary systems in multiple with the secondary member of the next preceding motor. In Fig. 1, for example, the machine M' acts as a mechanical brake on the machine M, and the energy thus absorbed is transferred along the belt C to drive M' as a generator in multiple with the secondary of M. At certain speeds of mechanical rotation and at certain corresponding frequencies on the secondary circuit the machine M', which is only excited by its own currents, will not tend to act as a generator, as is well understood in the art; but under these conditions there will be no mechanical load on the machine M, which will speed up slightly. This will increase the speed of M' and at the same time will reduce the frequency of the currents in the intermediate circuits. When this speeding-up has reached a certain amount, the speed of M' will become greater than the speed corresponding to the frequency of the currents in the intermediate circuits, and M' will be in the condition of an induction-machine driven above synchronism and will exert a drag on the machine M through the belt C, which will prevent any further increase of speed. The machine M', acting as a generator, then delivers current to the intermediate circuits of the same frequency as that of the current already flowing therein, and the energy which drives M' is transferred along the belt C from the machine M.

What I claim as new, and desire to secure by Letters Patent of the United States, is—

1. The combination of two or more induction-motors connected in tandem, with the secondary of the first motor in circuit with the primary of a succeeding motor, and the primary of the first motor connected with an alternating distribution system, with means for maintaining said motors in rotation at a speed different from that corresponding to the line frequency, and a circuit for operating translating devices connected in multiple with the secondary of one motor and the primary of the succeeding one.

2. The combination as a frequency-changer, of two or more mechanically-connected induction-motors coupled in tandem, and absorbing power from a supply-circuit, with a working circuit of different frequency from the supply-circuit connected in multiple with the secondary of one such motor and the primary of the succeeding motor in the series.

3. The combination of two induction-motors connected in tandem, one of which is coupled to an alternating supply-circuit, with a working circuit connected between the motors in multiple with the secondary of one and the primary of another, and means for regulating the speed of the motors and thereby the frequency of the last-mentioned circuit.

4. The combination of a series of mechanically-connected induction-motors coupled in tandem, with the secondary of one motor connected to the primary member of a succeeding motor, and circuits of different frequencies leading off from between the different pairs of motors, as set forth.

5. The combination of a series of induction-motors geared together and coupled in tandem, with circuits of different frequencies joined to the leads coupling the different pairs of motors, one or more alternating-current motors, and switches for transferring the motors from one to another of the last-mentioned circuits, as set forth.

6. The combination of two induction-motors, with the secondary of one connected to the primary of the other, means, in addition to said connection, for causing a transfer of energy from one motor to the other, and a circuit extending from the leads connecting the said primary with the said secondary to a translating device, whereby the two motors act as a converter of frequency.

7. The combination of two induction-motors connected in tandem, one of which is coupled to an alternating supply-circuit, with a working circuit connected between the motors in multiple with the secondary of one and the primary of the other, and means for fixing the speed of the second motor, to fix the frequency of the currents in the working circuit.

8. A frequency-changer composed of two dynamo-electric machines of the rotary field type, connections from one of the machines to a supply system, connections from the frequency-changer to a secondary system, and means whereby the speed of one of the machines is so modified by the action of the other that the currents induced in its secondary member, and fed therefrom to the secondary system, are of a definite frequency different from the frequency of the currents in the supply system.

9. A frequency-changer composed of two dynamo-electric machines of the rotary field type, connections from one of the machines to a supply system, connections from the frequency-changer to a secondary system, and means whereby the speed of one of the machines is so modified by the action of the other that the currents induced in its secondary member, and fed therefrom to the secondary system, are of a frequency different from the frequency of the currents which would be normally induced therein.

10. The method of distributing electrical energy which consists in generating alternating current of a given frequency and supplying it to a distribution system, and at one or more points on said system producing by said current a rotary field in the primary member of one of a pair of dynamo-electric machines receiving energy from the said system, generating in the secondary of said machine an alternating current by the relative rotation between the said field and the secondary, and so modifying the speed of the said rotation by the action of the other machine, that the frequency of the current induced in the secondary is different from that which would be normally induced therein, and also different from the frequency of the original alternating currents, and supplying the current thus induced to a secondary system.

11. The combination of two dynamo-electric machines of the rotary field type, mechanically coupled together and adapted to exert torque in opposition to each other, and means whereby current of one frequency delivered to the machines is delivered by the machines at a different frequency.

12. The combination of two dynamo-electric machines, the rotors of which have a fixed ratio of rotation, means for applying electrical energy directly to one only of said machines, and means whereby both machines coöperate to change the frequency of the current supplied.

13. The combination of two dynamo-electric machines each having two members capable of relative rotation when electrical energy is supplied directly to but one member only of one of the machines, a single source from which said energy is derived, electrical connections between said source and one of said machines, means whereby the machines coöperate to produce electric currents of a frequency different from that of the current supplied and means for supplying the currents so produced to a translating device.

14. The combination with a system of electrical distribution, of a frequency-changer consisting of a pair of dynamo-electric machines, so connected as to transfer energy from one to the other, a single set of connections from the system for supplying energy to the frequency-changer, a winding on one of said dynamo-electric machines in which currents are developed of a frequency having a definite ratio to that of the currents of the supply system, and a secondary system supplied with current generated in and derived from said winding.

15. The combination of two alternating-current dynamo-electric machines mechanically coupled together, one of said machines having a secondary member in which current of a definite frequency is induced, means whereby the reaction of the other machine definitely determines the frequency of the current so induced, a circuit containing one or more translating devices, and means for supplying said circuit with current induced in and derived from said secondary member.

16. The combination of two dynamo-electric machines of the rotary field type, means for supplying to one member of each machine an electric current, an energy-consuming circuit containing one or more translating devices, and means for supplying said circuit with energy derived from the induced member of one of said dynamo-electric machines.

17. The combination of a plurality of dynamo-electric machines, the rotors of which are mechanically geared together, means for producing in each machine a rotary magnetic field, electrical connections between one of the members of one machine and a line-circuit, a work-circuit adapted to feed one or more translating devices, and means for supplying said work-circuit with current derived from the secondary member of one of said machines.

18. The combination of a plurality of dynamo-electric machines of the rotary field type, means for maintaining a definite ratio between the respective rates of rotation of the rotors of said dynamo-electric machines, means for supplying an electric current to one member of each machine, a work-circuit adapted to feed one or more translating devices, and means for supplying said work-circuit with current derived from the secondary member of one of the machines.

19. The combination with a system of electrical distribution, of a frequency-changer consisting of a pair of dynamo-electric machines, one of which is adapted to act as an induction-generator and the other as a motor, means for maintaining a predetermined ratio of rotation between the two machines, connections for supplying current from the system of distribution to the frequency-changer, and means for deriving from the induction-generator current of a frequency different from that supplied to the frequency-changer.

20. The method of changing the frequency of alternating currents, which consists in supplying the initial currents to the primary of an induction or transformer motor, braking the secondary of the motor by gearing it to a mechanical load, reconverting the energy so expended into alternating currents, and feeding a circuit with currents representing the mechanical energy when thus reconverted and with the currents induced in the secondary of the transformer.

21. The method of changing the frequency of alternating currents, which consists in supplying alternating currents of given frequency to the primary of an induction or transformer motor, maintaining the speed of the motor at a rate different from that corresponding to the frequency of the supplied currents, and thereby inducing currents of different frequency in the secondary of the motor, converting the energy expended in maintaining the motor at the desired speed into electrical energy in the form of alternating currents of the same frequency as those induced in the secondary of the motor, and feeding the last-named currents into a circuit connected with the secondary of the motor.

22. The combination of a transformer or induction motor having its primary supplied with alternating currents of given frequency, and maintained in rotation at a speed different from that corresponding to the frequency of the supplied currents, a second dynamo-electric machine receiving power from the motor and a circuit containing translating devices connected with the secondary of the motor, as set forth.

23. The method of changing the frequency of alternating electromotive forces which consists in coupling an induction or transformer motor to a circuit or distributing system of given frequency, braking the secondary of the motor by a driven mechanism consuming mechanical energy, reconverting the mechanical energy into electrical energy and returning the energy when thus reconverted to the distribution system.

24. The method of changing the frequency of an alternating electric current which consists in supplying it to a frequency-changer comprising two alternating-current dynamo-electric machines connected in tandem, driving one of said machines as a motor and one as a generator, transferring energy from one to the other, taking off current from said frequency-changer of a frequency different from that of the current supplied, and feeding said current to translating devices, substantially as described.

25. The method of utilizing electric current which consists in supplying it to the primary of an induction-motor, producing thereby a current in the secondary of said motor and a torque upon its shaft, supplying the secondary current thus produced to a translating device, utilizing the said torque to drive a generator, and feeding the current from said generator to the translating device upon the same mains with the said secondary current, substantially as described.

26. The method of supplying a translating device with currents of any desired frequency, which consists in generating alternating currents, supplying them to the primary of an induction-motor, supplying currents from the secondary of the induction-motor to the translating device, retarding the induction-motor so as to vary its slip according to the frequency desired upon the secondary circuit, and generating by the energy consumed by such retardation an electric current.

In witness whereof I have hereunto set my hand this 28th day of January, 1895.

CHARLES P. STEINMETZ.

Witnesses:
B. B. HULL,
A. F. MACDONALD.